United States Patent
Chen

(10) Patent No.: US 11,042,386 B2
(45) Date of Patent: Jun. 22, 2021

(54) METHOD FOR PRELOADING APPLICATION, TERMINAL DEVICE, AND MEDIUM

(71) Applicant: Guangdong Oppo Mobile Telecommunications Corp., Ltd., Guangdong (CN)

(72) Inventor: Yan Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 221 days.

(21) Appl. No.: 16/150,691

(22) Filed: Oct. 3, 2018

(65) Prior Publication Data
US 2019/0155619 A1  May 23, 2019

(30) Foreign Application Priority Data
Nov. 20, 2017 (CN) .......................... 201711158921.0

(51) Int. Cl.
*G06F 9/445* (2018.01)
*H04L 12/24* (2006.01)
(Continued)

(52) U.S. Cl.
CPC ...... *G06F 9/44505* (2013.01); *G06F 9/44521* (2013.01); *G06N 3/0445* (2013.01);
(Continued)

(58) Field of Classification Search
CPC .................................. G06F 9/445; H04L 41/42
See application file for complete search history.

(56) References Cited

U.S. PATENT DOCUMENTS 8,176,437 B1 * 5/2012 Taubman ............ G06F 9/44578
715/810
10,310,872 B2 * 6/2019 Tsirkin ................ G06F 9/44521
(Continued)

FOREIGN PATENT DOCUMENTS

CN     105453042 A     3/2016
CN     105939416 A     9/2016
(Continued)

OTHER PUBLICATIONS

Extended European search report issued in corresponding European application No. 18194865.4 dated Apr. 23, 2019.
(Continued)

*Primary Examiner* — Phil K Nguyen

(57) ABSTRACT

A method for preloading an application, a terminal device, and a medium are provided. The method for preloading an application includes the following. An application predictive model is obtained by training a simple recurrent unit (SRU) neural network model according to multiple groups of usage timing association records. Usage status information of applications of a terminal of at least two past time points of a next time point is acquired. Probability values of launching the applications are acquired from the application predictive model by processing the usage status information of the applications with the application predictive model. An application to-be-launched at the next time point is determined according to the probability values and the application to-be-launched is preloaded.

16 Claims, 6 Drawing Sheets

---

Acquiring usage timing association records within a preset time period — 101

Obtaining a plurality of groups of usage timing association records by grouping the usage timing association records — 102

Generating an application prediction model by training a preset simple recurrent unit (SRU) neural network model according to the plurality of groups of usage timing association records — 103

(51) Int. Cl.
*G06N 3/04* (2006.01)
*G06N 3/08* (2006.01)

(52) U.S. Cl.
CPC ............ *G06N 3/0472* (2013.01); *G06N 3/08* (2013.01); *H04L 41/142* (2013.01)

(56) References Cited

U.S. PATENT DOCUMENTS

| | | | |
|---|---|---|---|
| 10,439,921 B1* | 10/2019 | Dubey | H04W 24/08 |
| 10,706,187 B1* | 7/2020 | Ehrlund | G06F 9/4401 |
| 2002/0147797 A1 | 10/2002 | Stephen | |
| 2012/0324481 A1* | 12/2012 | Xia | G06F 9/485 |
| | | | 719/320 |
| 2013/0173513 A1* | 7/2013 | Chu | G06F 9/451 |
| | | | 706/14 |
| 2013/0311946 A1* | 11/2013 | Kwon | G06Q 10/109 |
| | | | 715/811 |
| 2014/0201655 A1* | 7/2014 | Mahaffey | G06F 3/04817 |
| | | | 715/765 |
| 2014/0366041 A1 | 12/2014 | Stanley-Marbell et al. | |
| 2014/0372356 A1* | 12/2014 | Bilal | G06F 9/44578 |
| | | | 706/46 |
| 2014/0373032 A1 | 12/2014 | Merry et al. | |
| 2016/0057639 A1* | 2/2016 | Smith | H04W 4/029 |
| | | | 455/423 |
| 2016/0127497 A1* | 5/2016 | Himmelreich | H04L 67/2847 |
| | | | 709/217 |
| 2018/0189107 A1* | 7/2018 | Bai | G06F 9/5027 |
| 2018/0217853 A1* | 8/2018 | Li | G06F 9/48 |

FOREIGN PATENT DOCUMENTS

| | | |
|---|---|---|
| CN | 106066805 A | 11/2016 |
| CN | 106648747 A | 5/2017 |
| CN | 107249074 A | 10/2017 |
| JP | 2015517707 A | 6/2015 |

OTHER PUBLICATIONS

Tingxin Yan et al, "Fast app launching for mobile devices using predictive user context", MOBISYS 2012: 10th International Conference on Mobile Systems, Applications and Services, (Jan. 1, 2012), p. 113, XP055106616, DOI:10.1145/2307636.2307648, ISBN 978-1-45-031301-8, p. 113-p. 120.
International search report issued in corresponding international application No. PCT/CN2018/104003 dated Nov. 28, 2018.
English translation of First examination report issued in corresponding Indian application No. 201814037238 dated Jun. 4, 2020.
English translation of First examination report issued in corresponding Chinese application No. 201711158921.0 dated Jun. 30, 2020.
Yang et al, "Intelligent Design System and Engineering Application of Coal Mine Roadway Support", dated Dec. 31, 2015 with English Translation. (11 pages).
China Second Office Action with English Translation for CN Application No. 201711158921.0 dated Jan. 29, 2021. (24 pages).
Lei et al, "Training RNNs as Fast as CNNs", dated Nov. 5, 2017. (17 pages).
Japanese Office Action with English Translation for JP Application 2020-512481 dated Mar. 16, 2021. (6 pages).

* cited by examiner

METHOD FOR PRELOADING APPLICATION, TERMINAL DEVICE, AND MEDIUM

CROSS-REFERENCE TO RELATED APPLICATION(S)

This application claims priority to Chinese Application Patent No. 201711158921.0, filed on Nov. 20, 2017, the entire disclosure of which is hereby incorporated by reference in its entirety.

TECHNICAL FIELD

This application relates to the technical field of machine learning, and more particularly to a method for preloading an application, a terminal device, and a medium.

BACKGROUND

With rapid development of electronic technologies and continuing improvement of people's living standard, terminals such as smart phones and tablet PCs have become an indispensable part of people's lives.

The terminal may be installed with various applications (application software, APP). In order to make the applications run more smoothly, the terminal can prepare loading resources for some applications in advance, that is, preload some applications in advance.

However, the applications cannot be preloaded at will, because if too many resources are preloaded, it will take up too much storage space and power consumption will become large, which will seriously affect fluency of the terminal. Therefore, it is important to optimize preloading mechanisms and reduce the power consumption of the terminal.

SUMMARY

According to implementations of the disclosure, a method and an apparatus for establishing an application predictive model, a method and an apparatus for preloading an application, a medium, and a terminal are provided, which can optimize application preloading mechanisms and reduce the power consumption of a system of the terminal.

According to a first aspect of the disclosure, a method for preloading an application is provided. An application predictive model is obtained by training a simple recurrent unit (SRU) neural network model according to a plurality of groups of usage timing association records. Usage status information of applications of a terminal of at least two past time points of a next time point is acquired. Probability values of launching the applications are acquired from the application predictive model by processing the usage status information of the applications with the application predictive model. An application to-be-launched at the next time point is determined according to the probability values and the application to-be-launched is preloaded.

According to a second aspect of the disclosure, a terminal device is provided. The terminal device includes at least one processor and a computer readable storage. The computer readable storage is coupled to the at least one processor and stores at least one computer executable instruction thereon which, when executed by the at least one processor, causes the at least one processor to carry out the follows. Usage status information of applications of a terminal of at least two past time points of a next time point is acquired. Probability values of launching the applications is acquired from an application predictive model, by inputting the usage status information into the application predictive model, the application predictive model is obtained based on a simple recurrent unit (SRU) neural network model and a plurality of groups of usage timing association records. An application to-be-launched at the next time point is determined according to the probability values and the application to-be-launched is preloaded.

According to a third aspect of the disclosure, non-transitory computer readable storage medium is provided. The non-transitory computer readable storage medium stores a computer program which, when executed by a processor, causes the processor to carry out the follows. A user behavior sample within a preset time period is acquired, where the user behavior sample includes usage timing association records of at least two applications. A plurality of groups of usage timing association records are obtained by grouping the usage timing association records. An application predictive model is obtained by training a simple recurrent unit (SRU) neural network model according to the plurality of groups of usage timing association records.

DETAILED DESCRIPTION

Figure 1:
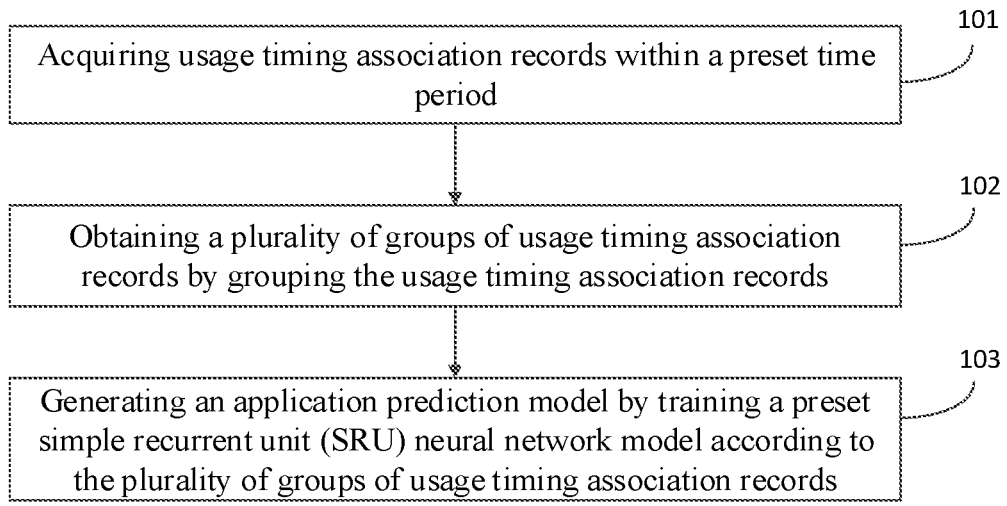
FIG. 1 is a schematic flow chart illustrating a method for establishing an application predictive model according to an implementation of the disclosure.

Technical solutions of the present disclosure will be further described below through implementations with reference to the accompanying drawings. It will be appreciated that the implementations are described herein for the purpose of explaining the disclosure rather than limiting the disclosure. In addition, it should also be noted that, for the convenience of description, only some rather than all structures related to the present disclosure are illustrated in the accompanying drawings.

Before discussing the exemplary implementations in more detail, it should be mentioned that some exemplary implementations are described as processes or methods of a flow chart. Although steps in the flow chart are depicted as being processed sequentially, some of these steps may be performed in parallel, concurrently, or simultaneously. In addition, the order of the steps can be rearranged. The process may be terminated when a corresponding operation(s) is completed, but there may be additional steps not illustrated in the drawings. The process may correspond to a method, a function, a procedure, a subroutine, a subprogram, and the like.

Preloading an application on a terminal device is a common and effective way to improve the user experience. By making the loading resources for some applications ready in advance, it makes the applications run more smoothly.

In the related art, the application is preloaded mainly based on a statistical method. For example, there may be only a few applications most frequently used by a user, and all of them may be preloaded. For another example, applications may be scored and ranked according to the user's usage habits, applications with higher scores may be preloaded. However, the above method ignores association information of the applications and time information, which leads to insufficient prediction accuracy of the application to be preloaded and needs to preload too many resources; actually, only one application will be used next time, that is, at a next moment, so this affects the user experience. Therefore, it's important to accurately predict which applications the user will launch next time.

Implementations of the disclosure provide technical schemes for preloading an application. Initially, an application predictive model needs to be obtained, which can be transplanted to a terminal device such as a smart device, for the purpose of predicting an application to-be-launched in the future, such that the terminal device can preload the application to-be-launched according to the prediction of the model. For example, if it is necessary to predict the user behavior at the next moment, obtain the usage status information of the applications in several past moments (such as five past moments) and input it to the model, and then calculation will be conducted in the model to obtain the predicted value of the next moment, that is, the application the user will use next time, thus, it is possible to achieve application preloading.

In order to obtain the application predictive model, usage timing association records, which can be comprehended as a usage behavior sample, can be constructed for applications selected. Then the usage timing association records or other information derived there from can be used to train neural network model, to obtain the application predictive model.

Technical schemes of the disclosure can speed up the loading of applications without taking up too much resources and storage spaces, which can in turn speed up processor processing of terminal devices. In addition, the implementation of the technical schemes provided herein, such as generating the application predictive model and preloading an application, do not require manual intervention. The following aspects of the disclosure contribute to it advantages, and each will be described in detail below.

Implementations of the disclosure first provide a method for establishing an application predictive model, which is embodied as follows. Usage timing association records within a preset time period are acquired. Multiple groups of usage timing association records are obtained by grouping the usage timing association records. An application predictive model is generated by training a preset simple recurrent unit (SRU) neural network model according to the multiple groups of usage timing association records. Implementation of the method will be depicted with reference to FIG. 1.

FIG. 1 is a schematic flow chart illustrating a method for establishing an application predictive model according to an implementation of the disclosure. The method can be implemented by an apparatus for establishing an application predictive model. The apparatus can be implemented with software and/or hardware and generally can be integrated into a terminal. The terminal may be a server or a mobile terminal. The server for example is a modeling server for completing a function of establishing an application predictive model. As illustrated in FIG. 1, the method begins at block 101.

At block 101, usage timing association records of at least two applications within a preset time period are acquired.

The following describes a statistical process of user behavior, which aims to determine target applications (that is, the at least two applications) subsequently analyzed.

In implementations of the disclosure, the usage timing association records refer to historical usage timing association records of applications of the terminal within the preset time period. For example, usage timing association records may be the records of the applications of the terminal between 8:00 am to 20:00 pm. In one implementation, the user used APP 1 at about 8:00 am, turned to APP 2 from APP 1 at about 8:30 am, and turned to APP 3 from APP 2 around 9:00 am. In another implementation, the user used APP 5 at about 11:40 am and turned to APP 5 from APP 4 at about 12:00 am. As can be seen, the usage timing association records of the applications contain usage records of the applications at various time points as well as timing relationship between the applications.

Although a variety of applications are installed on the terminal, the number of applications used by the user is limited during a preset period of time, such as one day, and the number of applications frequently used by the user is also limited. Most applications are used less frequently, and can be used once by the user within a week or even a month. If using all applications installed on the terminal as training samples for an application predictive model, not only the amount of data is large, but also the precision of establishing the application predictive model will be affected, which will affect the prediction accuracy for an application to-be-launched by the user at a next moment.

In one implementation, the usage timing association records of at least two applications within the preset time period are acquired as follows. Applications are sorted according to frequencies of use of the applications within the preset time period. At least two applications are determined according to a sorting result. Usage timing association records are determined according to usage status information of the at least two applications. In this way, the amount of data for training samples when establishing the application predictive model can be greatly reduced, and the precision and efficiency of establishing the application predictive model can be improved, thus further improving the accuracy of predicting an application to-be-launched.

The preset time period is from 8:00 am to 22:00 pm for example, and frequencies of use of the applications within this preset time period are counted. The applications can be sorted according to the frequencies of use thereof, for example, the applications can be sorted in descending order of the frequencies. According to a sorting result, first M applications are selected as target applications, that is, the first M applications are determined as frequently used applications, where M≥2. Further, usage timing association records can be determined according to usage status information of the M applications, where the usage timing association records record usage of the M applications at each time point within the preset time period. The usage timing association records contain usage information of the M applications and corresponding time points when the M applications are used, and further contain timing relationship of usage of the M applications.

It is to be noted that when using the applications on the terminal, invalid usage records of applications may be generated due to accidental operations of the user. For example, the user is intended to trigger APP 1 but mistakenly clicked on APP 2, and in this case, the user may quickly exit APP 2. However, the accidental operation also generated some usage records, which can also affect the precision of establishing the application predictive model, thus affecting the accuracy of predicting an application that will be launched next moment by the user.

In view of the above, the invalid application usage records may be filtered out from historical usage records of the applications within the preset time period. In one implementation, if an application is used less than a preset time period, usage records of the application will be filtered out. For example, if the user uses application A for 3 seconds (3 s for short) and the preset time period is 5 s, the usage record in which application A is used for 3 s will be filtered out, that is, removed or deleted. In this way, the precision of establishing the application predictive model and the accuracy of predicting an application to-be-launched can be effectively improved.

It should be noted that the invalid usage records of the applications can be first filtered out from the historical usage records of the applications before determining the target applications (the frequently used applications) according to the frequencies of use of the applications. Alternatively, the target applications (the frequently used applications) can be first determined according to the frequencies of use of the applications and then the invalid usage records of the applications are filtered out. The order of the operations of filtering out the invalid usage records of the applications and determining the target applications according to the frequencies of use of the applications are not limited herein.

In one implementation, the usage timing association records can be determined according to the usage status information of the at least two applications as follows. A usage log or usage logs (can be comprehended as a user behavior sequence) of the at least two applications are sampled according to a preset sampling period to determine whether the at least two applications are in use at sampling time points. The usage timing association records are determined by associating the usage status information of the at least two applications according to the sampling time points. In this way, it is possible to acquire the usage timing association records of the applications within the preset time period more flexibly, improve the precision of establishing the application predictive model, and further improve the accuracy of predicting an application to-be-launched.

In one implementation, the usage log of the at least two applications in the preset time period are first sampled from the initial time of the preset time period, and are further sampled every three minutes. For example, the preset time period is from 8:00 am to 12:00 am, then the first sampling can be executed at 8:00 am, the second sampling can be executed at 8:03 am, the third sampling can be executed at 8:06 am, and so on, until the usage log of the at least two applications within the preset time period are all sampled. In one implementation, the preset sampling period is set according to a length of the preset time period; for example, if the preset time period is long, the preset sampling period can be adaptively set longer; if the preset time period is short, the preset sampling period can be adaptively set shorter. In another implementation, the preset sampling period can be adaptively set according to user requirements; for example, if an application to-be-launched requires high prediction accuracy, the preset sampling period can be set shorter; if an application to-be-launched requires low prediction accuracy, the preset sampling period can be set longer. In still another implementation, the preset sampling period can be set according to the terminal's ability to process data; for example, if the terminal has large ability to process the data amount for training samples during establishing the application predictive model, the preset sampling period can be set shorter; if the terminal can have less ability to process the data amount for training samples during establishing the application predictive model, the sampling period can be set longer. The disclosure does not limit the length and setting manners of the preset sampling period.

In this implementation, usage status information of each application at each sampling time point is determined. It should be noted that at one sampling time point, there is only one application in use, or no application is in use at one sampling time point, for example, the terminal is in desktop display status or the terminal is screen-off. Thereafter, the usage timing association records are determined by associating the usage status information of the at least two applications according to the sampling time points and the usage status information. As an example, application A is in use at a first sampling time point, application B is in use at a second sampling time point, the terminal is screen-off at a third sampling time point, indicating that no application is in use, and application C is in use at a fourth sampling time point and so on. Based on the above, the usage timing association records can be determined by associating the usage status information of the at least two applications according to the sampling time points and the usage status information.

Optionally, usage association records of the applications can be recorded in the form of identification information of the sampling time points and usage status information. As an example, M applications are respectively marked with 1, 2, . . . , and M in descending order of frequencies of use, and if no application is in use at a sampling time point, use M+1 to indicate such situation.

In one implementation, a user behavior sequence is obtained by ranking, or additionally, filtering, usage records of applications. For example, the user behavior sequence includes usage records of M frequently used applications marked with 1, 2, . . . , and M (top M frequently used applications). Sampling is then performed on the user behavior sequence with a sampling interval of 3 min for example. If the terminal device is screen-off (that is, the screen is powered off) at some sampling time points, it indicates that currently there is no application in use, and "M+1" will be used to mark such situation; otherwise, if the terminal device is screen-on (that is, the screen is powered on) at some sampling time points, the marked number (1, 2, . . . , or M) of the application in use at the most recent time point prior to the sampling time point will be recorded. In this way, the final user behavior sequence, that is, the usage timing association records, can be obtained.

It can be understood that by using 1, 2, . . . , M, and M+1 as the identification information of the usage status of the applications, the usage association records of the applications can be recorded according to the identification information corresponding to the usage status information of the applications at the sampling time points. The disclosure does not particularly limit representation manners of the usage association records as long as unique information can indicate the usage status information of different applications at sampling time points.

At block 102, multiple groups of usage timing association records are obtained by grouping the usage timing association records.

In one implementation, the usage timing association records of the at least two applications within the preset time period are grouped to obtain the multiple groups of usage timing association records. In particular, the usage timing association records can be grouped according to timing relationship. It is understood that, the usage timing association records can be grouped according to the timing relationship to obtain multiple usage timing association sub-records, which can be treated as the multiple groups of usage timing association records. During grouping, the preset time period can be divided into several sub-time periods equally and the usage timing association records can be grouped according to the sub-time periods to obtain the multiple usage timing association sub-records as usage timing association records of the applications corresponding to the sub-time periods. In another implementation, the preset time period can be divided into several sub-time periods that are not completely equal or are completely unequal, and the usage timing association records can be grouped according to the sub-time periods thus divided. In still another implementation, in the process of grouping, the usage timing association records can be grouped in the form of sliding windows. As an example, a fixed-size sliding window with equal step sizes (step size refers to the length of time the window moves forward each time) or unequal step sizes can be applied to the usage timing association records of the applications within the preset time period, that is, the fixed-size sliding window moves forward over the usage timing association records of the applications within the preset time period, and usage timing association records corresponding to the sliding window at each position are determined as a group of usage timing association records. As another example, the sliding window can be scaled with different scales, the sliding window is scaled once every time it slides, multiple-scale sliding window with equal step sizes or unequal step sizes can be applied to the usage timing association records of the applications within the preset time period, and usage timing association records corresponding to the sliding window at each position are determined as a group of usage timing association records.

Figure 2:
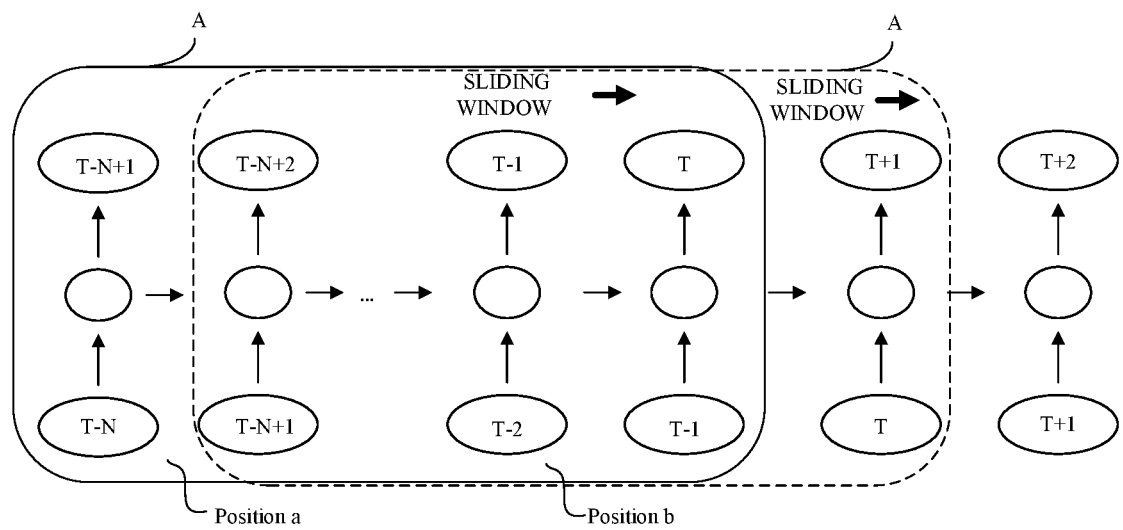
FIG. 2 is a schematic diagram illustrating a process of grouping usage timing association records in the form of sliding windows according to an implementation of the disclosure.

In one implementation, the usage log of the at least two applications can be sampled according to the preset sampling period, such that the usage timing association records of the at least two applications determined according to the sampling time points and the usage status information corresponding to the sampling time points can be grouped, to obtain the multiple groups of usage timing association records. For instance, the usage timing association records of the at least two applications within the preset time period can be grouped according to the timing relationship of the sampling time points and the number of the sampling time points. The sampling time points within the preset time period can be divided into several groups of sampling time points according to the timing relationship, and the number of sampling time points in each group can be exactly equal, not exactly equal, or completely unequal. Usage timing association records corresponding to each group of sampling time points can be determined as a group of usage timing association records. During grouping, the usage timing association records determined according to the sampling time points and the usage status information of the at least two applications corresponding to the sampling time points can also be grouped in the form of sliding windows. As an example, apply a fixed-size sliding window or multiple-scale sliding window with equal step size or unequal step size to the usage timing association records, such that usage timing association records corresponding to the sliding window at each position can be determined as a group of usage timing association records, where one step size can be deemed as one sampling time point. FIG. 2 is a schematic diagram illustrating a process of grouping usage timing association records in the form of sliding windows according to an implementation of the disclosure. As illustrated in FIG. 2, sliding window A is size fixed and a step size of sliding window A is one sampling time point, in particular, T−n+1, T−n, . . . , T, T+1, and T+2 in FIG. 2 all indicate sampling time points. As can be seen from FIG. 2, sliding window A moves from the very left of the usage timing association records to the very right. Each time the sliding window moves rightwards by one position, and the usage timing association records corresponding to the sliding window at each position are determined as one group of usage timing association records. In FIG. 2, the usage timing association records correspond to sampling time point T−n+1 to sampling time point T, that is, when the sliding window is at position a, is determined as one group of usage timing association records; the usage timing association records correspond to sampling time point T−n+2 to sampling time point T+1, that is, when the sliding window is at position b, is determined as another group of usage timing association records.

In one implementation, the multiple groups of usage timing association records are (m−n+1) groups of usage timing association records, n indicates the number of sampling time points associated with each of the multiple groups of usage timing association records and is an integer greater than or equal to 2, and m indicates the total number of sampling time points in the preset sampling period and is an integer greater than or equal to 3, where the $i^{th}$ group of usage timing association records includes usage timing association records of the at least two applications at the $i^{th}$ to the $(i+n-1)^{th}$ sampling time point, and i is an integer and ranges from 1 to (m−n+1).

In one implementation, usage timing association records of the at least two applications at the first to the $n^{th}$ sampling time point can be determined as a first group of usage timing association records, usage timing association records of the at least two applications at the second to the $(n+1)^{th}$ sampling time point can be determined as a second group of usage timing association records, and the $(m-n+1)^{th}$ group of usage timing association records can be determined in the above manner, where n is a natural number greater than or equal to 2 and m indicating the number of sampling time points is a natural number greater than or equal to 3. In this way, the sliding window is applied to the entire usage timing association records and any situation where usage status information switch may occur will not be missed, as a result, usage status information miss rate of the usage timing association records of the at least two applications within the preset time period is extremely low. Thus, the precision of establishing the application predictive model and the accuracy of predicting an application can be effectively improved.

As an example, usage timing association records of the at least two applications at the first to the $n^{th}$ sampling time point can be determined as a first group of usage timing association records, usage timing association records of the at least two applications at the second to the $(n+1)^{th}$ sampling time point can be determined as a second group of usage timing association records, and so on, and the $(m-n+1)^{th}$ group of usage timing association records can be determined in the above manner, where n is a natural number greater than or equal to 3 and m indicating the number of sampling time points is a natural number greater than or equal to 4. For example, suppose n=5 and m=8, that is, usage timing association records of the at least two applications within the preset time period correspond to eight sampling time points, and usage timing association records corresponding to every five sampling time points according to the timing relationship can be determined as a group of usage timing association records. In particular, usage timing association records at the first to the fifth sampling time point can be determined as a first group of usage timing association records, usage timing association records at the second to the sixth sampling time point can be determined as a second group of usage timing association records, usage timing association records at the third to the seventh sampling time point can be determined as a third group of usage timing association records, and usage timing association records at the fourth to the eighth sampling time point can be determined as a fourth group of usage timing association records.

At block 103, an application predictive model is generated by training a preset simple recurrent unit (SRU) neural network model according to the multiple groups of usage timing association records.

In one implementation, the application predictive model can be generated by training the SRU neural network model (hereinafter referred as SRU network) by using the multiple groups of usage timing association records as training samples.

The SRU network is a variant of a recurrent neural network (RNN). In other words, the SRU network is a special type of RNN.

In one implementation, usage status information corresponding to sampling time points in multiple groups (at least two groups) of usage timing association records are used as the training samples, which are input into the SRU network for training. That is, the usage status information of the applications corresponding to the sampling time points associated with the multiple groups of usage timing association records can be used as the training samples to train the SRU network, to generate the application predictive model. The multiple groups of usage timing association records are obtained by grouping the usage timing association records of the at least two applications within the preset time period at block 102.

The application predictive model includes a forget gate $f_t$, a reset gate $o_t$, a memory cell $c_t$, and an output status cell $h_t$, which are expressed as follows:

$$\tilde{x}_t = W x_t \quad (1)$$

$$f_t = \sigma(W_f x_t + b_f) \quad (2)$$

$$r_t = \sigma(W_r x_t + b_r) \quad (3)$$

$$c_t = f_t \otimes c_{t-1} + (1-f_t) \otimes \tilde{x}_t \quad (4)$$

$$h_t = r_t \otimes g(c_t) + (1-r_t) \otimes x_t \quad (5)$$

where $x_t$ indicates usage status information of an application used at time point t in the usage timing association records, $\tilde{x}_t$ indicates an input conversion amount of the usage status information of the application used at time point t in the usage timing association records, W and $W_*$ indicate network parameters learned, $b_*$ indicates a bias parameter learned, $* \in \{f, r\}$, $f_t$ indicates a forget gate at time point t, and $r_t$ indicates a reset gate at time point t; $c_t$ indicates an internal status cell at time point t, $c_{t-1}$ indicates an internal status cell at time point t-1, and $h_t$ indicates an output status cell at time point t; $\sigma$ indicates a Sigmoid function expressed as $$S(x) = \frac{1}{1 + e^{-x}};$$

$\otimes$ indicates element-wise product of vectors; g( ) indicates an activation function, which may be a Relu function, or may be a Softmax function. The disclosure is not limited herein.

In the application predictive model, $x_t$ indicates usage status information of the applications at time point t in the usage timing association records. At the same time point (such as at time point t), usage status information of the applications is uniquely determined. That is, only one application is in use or no application is in use at one time point and therefore, $x_t$ is expressed in the form of a one-hot code vector. As an example, the target applications include M applications, for convenience, the M applications are marked with 1, 2, . . . , and M respectively. In addition, if no application is in use, usage status information is marked with M+1. For example, M=10 and an application marked with 7 is in use at time point t, then a predicted code vector at time point t is [0,0,0,0,0,0,1,0,0,0,0], that is, in the predicted code vector, an element corresponding to the application marked with 7 is 1, and the rest elements are all 0. In one implementation, $\tilde{x}_t$ indicates the input conversion amount of $x_t$, as will be appreciated by those skilled in the art, by multiplying $x_t$ by a network parameter W (weight matrix), it is possible to use $x_t$ to update the internal status unit $c_t$ in a more flexible manner.

As illustrated in the above formulas (1)-(3), the input conversion amount $\tilde{x}_t$ of $x_t$, the forget gate $f_t$, and the reset gate $r_t$ are associated with usage status information (expressed as one-hot code vector) of applications input at time point t regardless of an output status t-1 at a previous time point (that is, time point t-1). That is, there is no need to wait until output status $h_{t-1}$ at time point t-1 has been calculated before calculating the input conversion amount $\tilde{x}_t$, the forget gate $f_t$, and the reset gate $f_t$. It should to be noted that, for a given group of usage timing associated records $\{x_1, x_2, \ldots x_{n-1}, x_n\}$ of the applications, an input conversion amount $\tilde{x}_t$, a forget gate $f_t$, and a reset gate $r_t$ are independent in terms of different time step sizes t, where t=1, 2 . . . , n-1, n, therefore, the above vectors $\{\tilde{x}_t, f_t, r_t\}$ can be calculated in parallel. According to the formulas (4)-(5), calculation of the internal status unit $c_t$ at time point t still relies on the internal status $c_{t-1}$ at time point t-1, however, the output status $h_{t-1}$ at the last moment is no longer relied on upon. Besides, the calculation involved in the formulas (4)-(5) relates to operations between elements and can be carried out quickly and succinctly.

In one implementation, during generating the application predictive model by training the SRU network according to the multiple groups of usage timing association records, the number of cells of an input layer of the application predictive model can be determined according to vector dimensions of each group of usage timing association records, and the number of cells of an output layer of the application predictive model can be determined according to the number of the at least two applications. That is, the number of cells of the input layer of the application predictive model can be determined according to the vector dimensions of each group of usage timing association records and the number of cells of the output layer of the application predictive model can be determined according to the number of the at least two applications.

The SRU network includes the input layer, a hidden layer (that is, SRU cell layer), and the output layer. The hidden layer may include multiple SRU cell layers. Each SRU cell layer may include multiple SRU cell structures. The number of SRU cell structures in each SRU cell layer can be determined according to the number of sampling time points contained in each usage timing association record. In one implementation, the application predictive model contains two SRU cell layers. One SRU cell layer contains 32 neurons and the other SRU cell layer contains 50 neurons. As an example, each group of usage timing association records contains usage status information of the applications corresponding to n sampling time points, where n is an integer greater than or equal to 2, then each SRU cell layer contains n SRU cell structures.

The number of cells in the input layer (that is, the number of neurons in the input layer) can be determined according to the vector dimensions of each group of usage timing association records. As an example, if each group of usage timing association records contains usage status information of the applications corresponding to n+1 sampling time points, the usage status information of the applications at the first to the $n^{th}$ sampling time point can be used to predict the usage status information of the applications at the $(n+1)^{th}$ sampling time point. For example, applications used at the first n sampling time points in each group of usage timing association records are used as input vectors to predict an application that will be used at time point n+1. To facilitate the understanding, an application $x_t$ used at time point t is expressed as $APP_t$, that is, usage status information of the applications at time point t. Based on this, a data format of training samples in the process of generating the application predication model is expressed as: $[APP_1, APP_2, \ldots, APP_{n-1}, APP_n] \rightarrow APP_{n+1}$, where $APP_1$ indicates an application used at the first sampling time point, $APP_2$ indicates an application used at the second sampling time point, $APP_{n-1}$ indicates an application used at the $(n-1)^{th}$ sampling time point, $APP_n$ indicates an application used at the $n^{th}$ sampling time point, and $APP_{n+1}$ indicates an application used at the $(n+1)^{th}$ sampling time point.

For example, if each group of usage timing association records contains usage status information of the applications corresponding to six sampling time points, then the usage status information of the applications at the first five sampling time points are used to predict the usage status information of the applications at the sixth sampling time point. For example, applications used at time points T−4, T−3, T−2, T−1, and Tin each group of usage timing association records are used as input vectors to predict an application to be used at time point T+1. That is, a data format of the training samples in the process of generating the application predication model is expressed as: $[APP_{T-4}, APP_{T-3}, APP_{T-2}, APP_{T-1}, APP_T] \rightarrow APP_{T+1}$, where $APP_{T-4}$ indicates an application used at time point T−4, $APP_{T-3}$ indicates an application used at time point T−3, $APP_{T-2}$ indicates an application used at time point T−2, $APP_{T-1}$ indicates an application used at time point T−1, $APP_T$ indicates an application used at time point T, and $APP_{T+1}$ indicates an application to be used at time point T+1.

It is to be noted that the number of cells of the input layer is equal to the number of SRU cell structures in each SRU cell layer.

The number of cells of the output layer of the application predictive model can be determined according to the number of the at least two applications. As an example, the at least two applications are embodied as M applications, that is, the application predictive model is established according to usage timing association records of the M applications, and the number of cells of the output layer of the application predictive model is M+1 (including a situation where no application is in use).

In one implementation, during generating the application predictive model by training the SRU network according to multiple groups of usage timing association records, the application predictive model adopts an error function, which is a cross entropy loss function expressed as:

$$J = \sum_{k=1}^{C} y_k \log(\hat{y}_k),$$

where $y_k$ indicates an actual value of usage status information of each application, $y_k$ indicates a predicted value of the usage status information of each application, C=M+1, M indicates the number of the at least two applications, and J indicates a cross entropy of the application predictive model. In this way, the preset neural network parameters can be further optimized, a better application predictive model can be obtained, and the accuracy of predicting an application to-be-launched can be further improved.

In the foregoing implementations, $APP_{T+1}$ may be in the form of one-hot code, that is, the usage status information of the applications is unique at time point T+1. For example, the target applications include M target applications, which are marked with 1, 2, . . . , and M individually. In addition, use M+1 to indicate a situation where no application is in use. In particular, M=10 and an application marked with 5 is in use at time point T+1, then a predicted code vector is [0,0,0,0,1,0,0,0,0,0,0] at time point t+1; as can be seen, an element corresponding serial number 5 is 1, and the rest elements are all 0.

During training the SRU network with the random gradient descent method, the training can be completed when a loss value is equal to or less than a preset loss threshold. Alternatively, the training can be completed when two or more loss values acquired continuously remain unchanged. After the training is completed, each parameter in the application predictive model at this time can be acquired and saved as optimal parameters. The optimal parameters can be used for prediction when we need to predict an application through the application predictive model. In particular, the random gradient descent method can be conducted with small batches to obtain the optimal parameters, for example, the batch size is 128.

According to the implementations of the disclosure, the application predictive model can be generated by grouping the usage timing association records of the applications within the preset time period into multiple groups of usage timing association records and inputting the multiple groups of usage timing association records as the training samples into the SRU network for training. In this way, the usage timing association records of the applications, which accurately reflect behaviors of the user, can be by fully used to optimize application preloading mechanisms, thus improving accuracy for predicting an application to-be-launched. In addition, the disclosure also has advantages of improving processing speed of training the application prediction model and saving time under the premise of ensuring the precision of application prediction model training.

Figure 3:
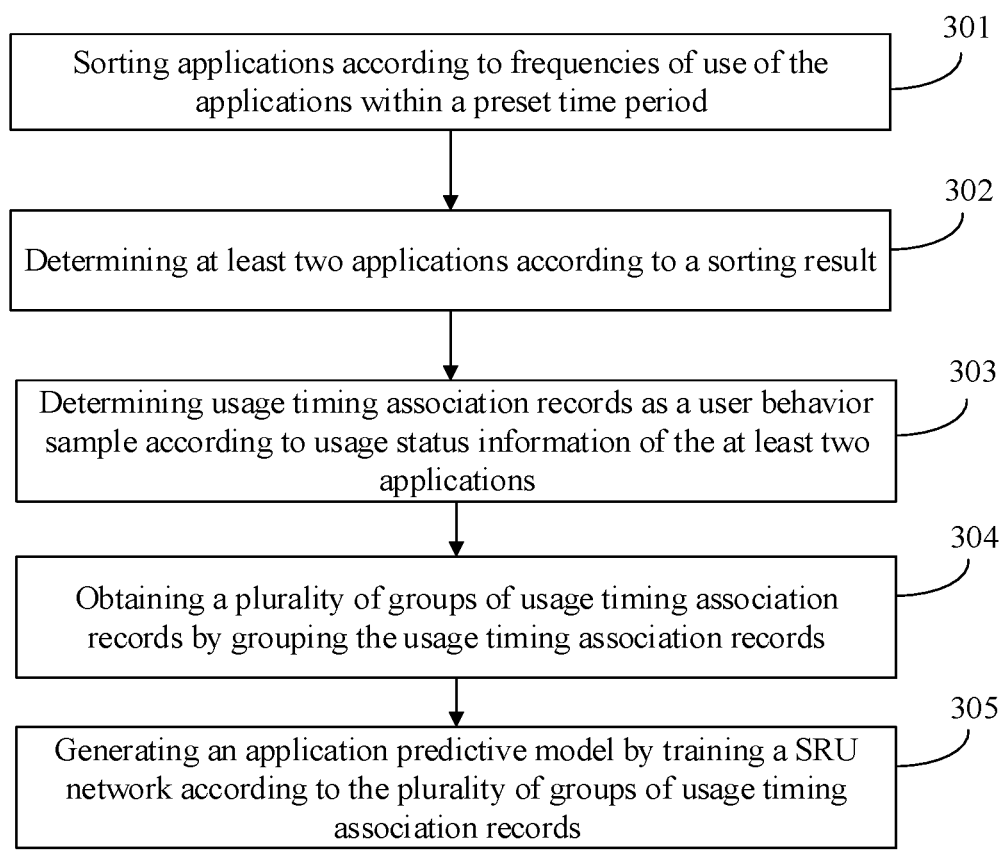
FIG. 3 is a schematic flow chart illustrating a method for establishing an application predictive model according to another implementation of the disclosure.

FIG. 3 is a schematic flow chart illustrating a method for establishing an application predictive model according to another implementation of the disclosure. The method begins at block 301.

At block 301, applications are sorted according to frequencies of use of the applications within a preset time period.

At block 302, at least two applications are determined according to a sorting result.

At block 303, usage timing association records are determined as a user behavior sample according to usage status information of the at least two applications.

At block 304, multiple groups of usage timing association records are obtained by grouping the usage timing association records.

At block 305, an application predictive model is generated by training a SRU network according to the multiple groups of usage timing association records.

According to the implementations of the disclosure, the usage timing association records of the applications, which accurately reflect behaviors of the user, can be by fully used to optimize application preloading mechanisms, and the precision of predicting the application predictive model can be effectively improved, thus further improving the accuracy of the prediction for an application-to-be-launched.

Figure 4:
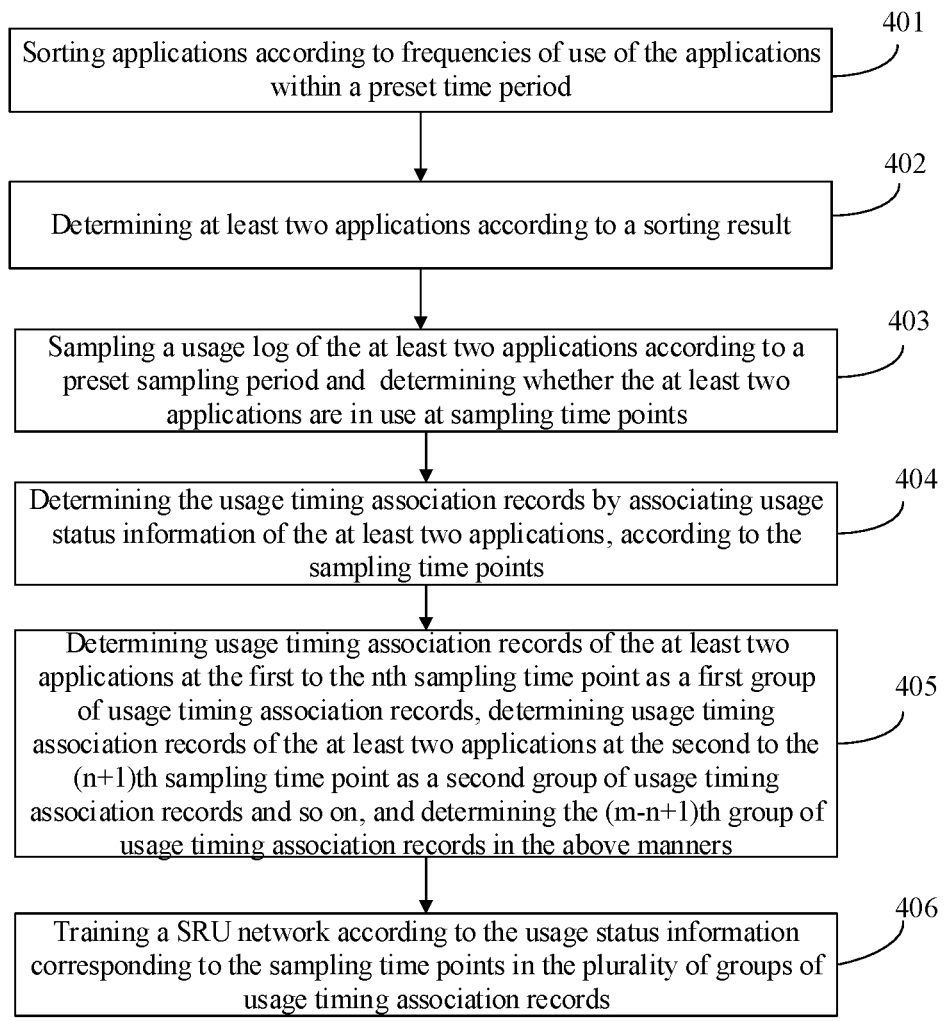
FIG. 4 is a schematic flow chart illustrating a method for establishing an application predictive model according to yet another implementation of the disclosure.

FIG. 4 is a schematic flow chart illustrating a method for establishing an application predictive model according to yet another implementation of the disclosure. The method begins at block 401.

At block 401, applications are sorted according to frequencies of use of the applications within a preset time period.

At block 402, at least two applications are determined according to a sorting result.

At block 403, a usage log of the at least two applications is sampled according to a preset sampling period and whether the at least two applications are in use at sampling time points is determined.

At block 404, the usage timing association records are determined by associating usage status information of the at least two applications, according to the sampling time points.

At block 405, usage timing association records of the at least two applications at the first to the $n^{th}$ sampling time point are determined as a first group of usage timing association records, usage timing association records of the at least two applications at the second to the $(n+1)^{th}$ sampling time point are determined as a second group of usage timing association records, and so on, and the $(m-n+1)^{th}$ group of usage timing association records is determined in the above manners.

In particular, n is a natural number greater than or equal to 2 and m indicating the number of sampling time points is a natural number greater than or equal to 3.

At block 406, the SRU network is trained according to the usage status information corresponding to the sampling time points in the multiple groups of usage timing association records.

With aid of the technical solutions of the disclosure, the usage timing association records of the applications within the preset time period can be more flexibly acquired, the precision of establishing the application predictive model and the prediction accuracy for an application to-be-launched can be improved.

Figure 5:
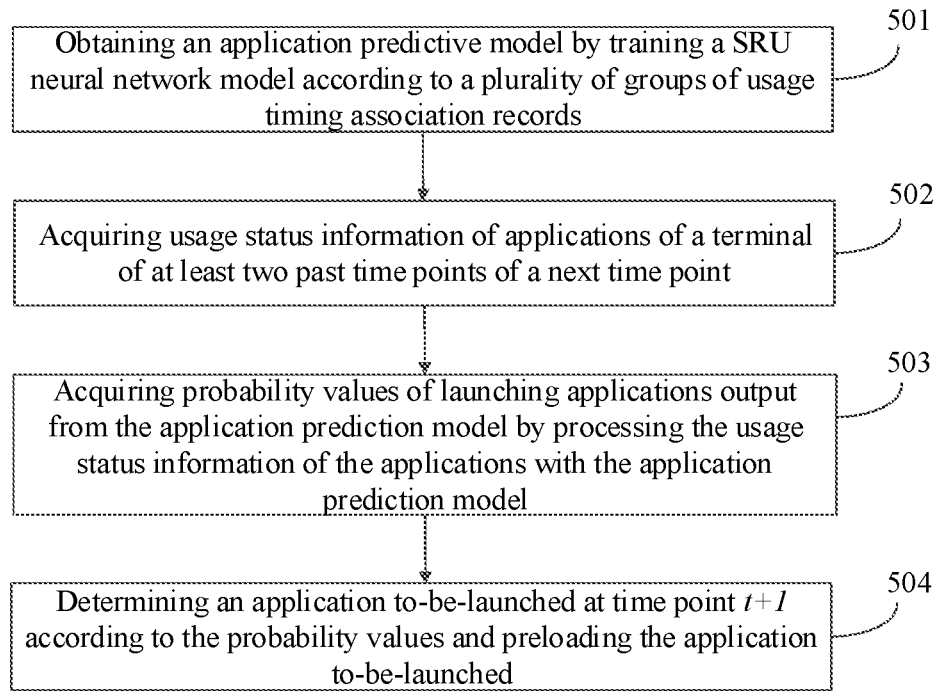
FIG. 5 is a schematic flow chart illustrating a method for preloading an application according to an implementation of the disclosure.

FIG. 5 is a schematic flow chart illustrating a method for preloading an application according to an implementation of the disclosure. The method can be implemented by an apparatus for preloading an application, where the apparatus can be implemented through software and/or hardware. The apparatus can be integrated into a terminal. As illustrated in FIG. 5, the method begins at block 501.

At block 501, an application predictive model is obtained by training a simple recurrent unit (SRU) neural network model according to multiple groups of usage timing association records. Reference can be made to the foregoing description in regards of the method of establishing an application predictive model in conjunction with FIG. 1 to FIG. 4.

In one implementation, the application predictive model can be obtained as follows. Usage timing association records of at least two applications within a preset time period are acquired. The multiple groups of usage timing association records are acquired by grouping the usage timing association records. The SRU neural network model is trained according to the multiple groups of usage timing association records to obtain the application predictive model.

The usage timing association records of the at least two applications within the preset time period can be acquired as follows. Applications are sorted according to frequencies of use thereof within the preset time period. The at least two applications are determined according to a sorting result. The usage timing association records are determined according to usage status information of the at least two applications.

In one implementation, the usage timing association records are determined according to usage status information of the at least two applications as follows. A usage log of the at least two applications is sampled according to a preset sampling period and whether the at least two applications are in use at sampling time points in the preset sampling period is determined. The usage timing association records are determined by associating the usage status information of the at least two applications according to the sampling time points.

In one implementation, the SRU neural network model is trained according to the multiple groups of usage timing association records as follows. The SRU neural network model is trained according to the usage status information of the at least two applications at the sampling time points in the multiple groups of usage timing association records.

In one implementation, prior to the sorting, for each application, usage records in which the application is used shorter than a preset period are filtered out, and a frequency of use of the application is determined according to usage records after the filtering.

In one implementation, the multiple groups of usage timing association records are obtained with aid of a sliding window. For example, a sliding window is applied to the usage timing association records of the at least two applications within the preset time period, and usage timing association records corresponding to the sliding window at each position are determined as one group of usage timing association records.

At block 502, usage status information of applications of a terminal of at least two past time points of a next time point is acquired. For example, the at least two past time points refer to the most recent at least two time points, for example, include current time point t and historical time point t−1 to time point t−n, n is an integer greater than or equal to 2.

In one implementation, the time point t can be understood as the current time point, and correspondingly, acquiring the usage status information of the applications of the terminal at time point t can be understood as acquiring the current usage status information of the applications of the terminal. Correspondingly, acquiring the usage status information of the applications at time point t−1 to time point t−n can be understood as acquiring usage status information of the applications corresponding to the first n time points before the current time point respectively. The usage status information of the applications includes two situations, that is, one situation is that an application is in use and the other situation is that no application is in use. If there is an application that is currently in use, the usage status information will be marked with identification information or icon information corresponding to the application that is currently in use. On the other hand, if no application is currently in use, the usage status information can be marked with identification information indicating that currently there is no application in use. It should be noted that the usage status information of the applications can also be recorded in other forms.

At block 503, probability values of launching the applications are acquired from the application predictive model, by processing the usage status information of the applications with the application predictive model. For example, the usage status information is input into the pre-trained application predictive model and probability values of launching applications output from the pre-trained application predictive model are acquired.

In particular, the application predictive model is generated by training a SRU network according to multiple groups of usage timing association records. The multiple groups of usage timing association records are obtained by grouping usage timing association records of the applications within a preset time period.

The probability values includes first probability values each indicating a probability of launching one of the applications and a second probability value indicating a probability of launching no application. In this implementation, the usage status information of the applications of the terminal at time point t and the usage status information of the applications at time point t−1 to time point t−n are input into the pre-trained application predictive model, to obtain the probability values of launching the applications from the pre-trained application predictive model. As an example, $[APP_{t-n}, APP_{t-n+1}, \ldots, APP_{t-1}, APP_t]$ is input into the pre-trained application predictive model as an input vector, where $APP_{t-n}$ indicates an application used at time point t−n, $APP_{t-n+1}$ indicates an application used at time point t−n+1, $APP_{t-1}$ indicates an application used at time point t−1, and $APP_t$ indicates an application used at time point t (current time point). For example, the application predictive model is generated by training multiple groups of usage timing association records of the M applications within the preset period. When predicating an application, the application predictive model can output M+1 probability values, where M+1 probability values (that is, the first probability values) include probability values of launching M applications and a probability value (that is, the second probability value) of no application being in use.

At block 504, an application to-be-launched at the next time point, such as at time point t+1, is determined according to the probability values and the application to-be-launched is preloaded.

In this implementation of the disclosure, according to the probability values obtained at block 503, the application to be launched at time point t+1 can be determined. The application to be launched at time point t+1 can be deemed as an application that will be launched at the next moment of the current time. It can be appreciated that, the usage status information of the applications at time point t (the current time point) and the usage status information of the applications at time point t−1 to time point t−n (n time points before the current time point) are input into the pre-trained application predictive model as input vectors, so as to predict usage status information of the applications at time point t+1 (the next time point of the current time). That is, a data format for predicting corresponding usage status information of an application at the next time point through the pre-trained application predictive model is $[APP_{t-n}, APP_{t-n+1}, \ldots, APP_{t-1}, APP_t] \rightarrow APP_{t+1}$, where $APP_{t+1}$ indicates usage status information of an application at time point t+1 (the next time point of the current time point), that is, an application to be used at time point t+1.

For example, an application corresponding to the largest probability value among the probability values obtained at block 503 can be determined as the application to-be-launched. When no application has the largest probability value, an application corresponding to the second largest probability value can be determined as the application to-be-launched. Preload the application to-be-launched, such that when the user uses the application to-be-launched, usage efficiency and fluency can be improved.

With aid of the method for preloading an application, problems raised if too many application resources are pre-loaded, such as too many resources are took up, power consumption becomes large, and impact on the use of the terminal can be solved. In addition, the disclosure has advantages of effectively improving the accuracy of predicting an application to-be-launched, further reducing power consumption and memory occupation rate of a system of the terminal and optimizing application preloading mechanisms.

Figure 6:
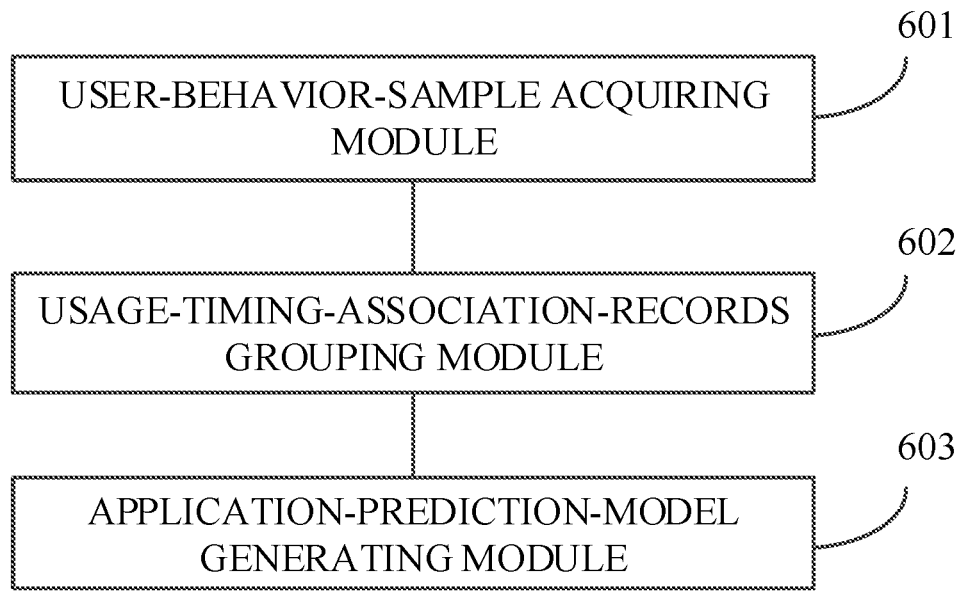
FIG. 6 is a schematic structural diagram illustrating an apparatus for establishing an application predictive model according to an implementation of the disclosure.

FIG. 6 is a schematic structural diagram illustrating an apparatus for establishing an application predictive model according to an implementation of the disclosure. The apparatus can be implemented with software and/or hardware and generally can be integrated into a terminal, such as a server. The application predictive model can be established through the foregoing method for establishing an application predictive model. As illustrated in FIG. 6, the apparatus includes a user-behavior-sample acquiring module 601, a usage-timing-association-records grouping module 602, and an application-prediction-model generating module 603.

The user-behavior-sample acquiring module 601 is configured to acquire a user behavior sample within a preset time period, where the user behavior sample includes usage timing association records of at least two applications.

The usage-timing-association-records grouping module 602 is configured to obtain multiple groups of usage timing association records by grouping the usage timing association records.

The application-prediction-model generating module 603 is configured to generate an application predictive model by training a preset SRU neural network model according to the multiple groups of usage timing association records.

According to the implementations of the disclosure, the usage timing association records, of the applications, that accurately reflect behaviors of the user can be fully used, to optimize application preloading mechanisms, thus improving the accuracy of predicting an application-to-belaunched. In addition, the disclosure also has advantages of improving processing speed of training the application prediction model and saving time under the premise of ensuring the precision of application prediction model training.

The user-behavior-sample acquiring module 601 include an application sorting unit, a target application determining unit, and a usage-timing-association-records determining unit. The application sorting unit is configured to sort applications according to frequencies of use of the applications within a preset time period. The target application determining unit is configured to determine at least two applications according to a sorting result. The usage-timing-association-records determining unit is configured to determine usage timing association records as the user behavior sample, according to usage status information of the at least two applications.

The usage-timing-association-records determining unit configured to determine the usage timing association records as the user behavior sample, according to the usage status information of the at least two applications is configured to: sample a usage log of the at least two applications according to a preset sampling period and determine whether the at least two applications are in use at sampling time points; determine the usage timing association records by associating the usage status information of the at least two applications, according to the sampling time points and the usage status information.

The application-prediction-model generating module 603 configured to train the SRU neural network model according to the multiple groups of usage timing association records is configured to train the SRU neural network model according to the usage status information of the at least two applications at the sampling time points in the multiple groups of usage timing association records.

The usage-timing-association-records grouping module 602 configured to obtain multiple groups of usage timing association records by grouping the usage timing association records is configured to: determine usage timing association records of the at least two applications at the first to the $n^{th}$ sampling time point as a first group of usage timing association records; determine usage timing association records of the at least two applications at the second to the $(n+1)^{th}$ sampling time point as a second group of usage timing association records; determine the $(m-n+1)^{th}$ group of usage timing association records in the above manners, where n is a natural number greater than or equal to 2 and m indicating the number of sampling time points is a natural number greater than or equal to 3.

The application predictive model includes a forget gate $f_t$, a reset gate $r_t$, a memory cell $c_t$, and an output status cell $h_t$, which are expressed as follows:

$$\tilde{x}_t = W x_t$$

$$f_t = \sigma(W_f x_t + b_f)$$

$$r_t = \sigma(W_r x_t + b_r)$$

$$c_t = f_t \otimes c_{t-1} + (1 - f_t) \otimes \tilde{x}_t$$

$$h_t = r_t \otimes g(c_t) + (1 - r_t) \otimes x_t$$

where $x_t$ indicates usage status information of an application used at time point t in the usage timing association records, $\tilde{x}_t$ indicates an input conversion amount of the usage status information of the application used at time point t in the usage timing association records, W and $W_*$ indicate network parameters learned, $b_*$ indicates a bias parameter learned, $* \in \{f, r\}$, $f_t$ indicates a forget gate at time point t, $r_t$ indicates a reset gate at time point t, $c_t$ indicates an internal status cell at time point t, $c_{t-1}$ indicates an internal status cell at time point t–1, $h_t$ indicates an output status cell at time point t, $\sigma$ indicates a Sigmoid function, $\otimes$ indicates element-wise product of vectors, and g( ) indicates an activation function.

In one implementation, the number of cells of an input layer of the application predictive model can be determined according to vector dimensions of each group of usage timing association records. The number of cells of an output layer of the application predictive model can be determined according to the number of the at least two applications.

In one implementation, the application prediction model adopts an error function, which is a cross entropy loss function expressed as:

$$J = \sum_{k=1}^{C} y_k \log(\hat{y}_k),$$

where $y_k$ indicates an actual value of usage status information of each application, $\hat{y}_k$ indicates a predicted value of the usage status information of each application, C=M+1, M indicates the number of the at least two applications, and J indicates a cross entropy of the application predictive model.

Figure 7:
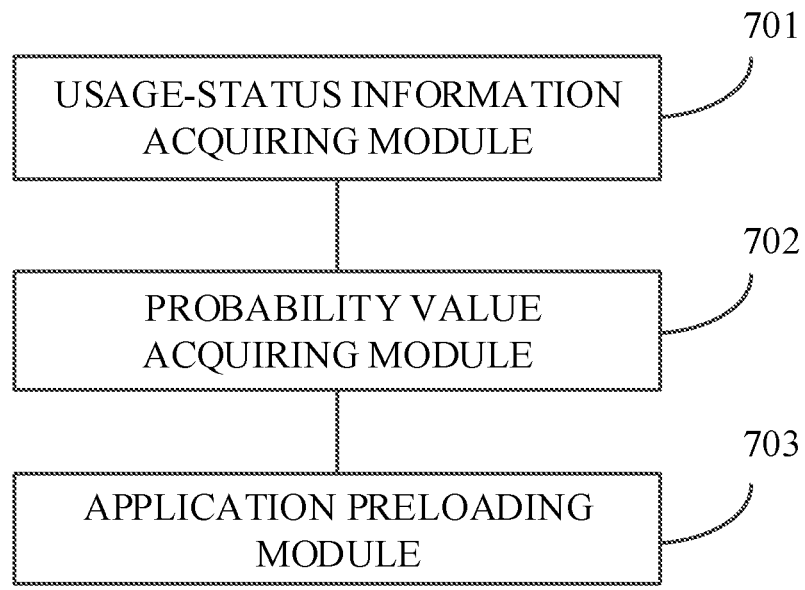
FIG. 7 is a schematic structural diagram illustrating an apparatus for preloading an application according to an implementation of the disclosure.

FIG. 7 is a schematic structural diagram illustrating an apparatus for preloading an application according to an implementation of the disclosure. The apparatus can be implemented with software and/or hardware, and generally can be integrated into a terminal. An application to-be-launched can be preloaded by executing a method for preloading an application. As illustrated in FIG. 7, the apparatus includes a usage-status information acquiring module 701, a probability value acquiring module 702, and an application preloading module 703.

The usage-status information acquiring module 701 is configured to acquire usage status information of applications of a terminal at time point t and usage status information of the applications at time point t–1 to time point t–n, where n is a natural number greater than or equal to 2.

The probability value acquiring module 702 is configured to input the usage status information into a pre-trained application predictive model and acquire probability values of launching each application output from the pre-trained application predictive model, where the application predictive model is generated by training a preset SRU neural network model according to multiple groups of usage timing association records, and the multiple groups of usage timing association records are obtained by grouping usage timing association records of the applications within a preset time period.

The application preloading module 703 is configured to determine an application to-be-launched at time point t+1 according to the probability values and to preload the application-to be-launched.

With aid of technical solutions of the disclosure, problems raised if too many application resources are preloaded, such as too many resources are took up, power consumption becomes large, and impact on the use of the terminal can be solved. In addition, the disclosure has advantages of effectively improving the accuracy of predicting an application to-be-launched, further reducing power consumption and memory occupation rate of a system of the terminal, and optimizing application preloading mechanisms.

According to implementations of the disclosure, a storage medium is provided. The computer storage medium can be configured to store computer executable instructions. The computer executable instructions are operable with a processor to execute the method for establishing an application predictive model. The method includes the following.

A user behavior sample within a preset time period is acquired, where the user behavior sample includes usage timing association records of at least two applications. Multiple groups of usage timing association records are obtained by grouping the usage timing association records. An application predictive model is generated by training a preset SRU neural network model according to the multiple groups of usage timing association records.

The storage medium refers to any of various types of memory devices or storage devices. The term "storage medium" is intended to include: a mounting medium such as a compact disc read-only memory (CD-ROM), a floppy disk, or a tape device; computer system memory or random access memory such as a dynamic random access memory (DRAM), a display data random access memory (DDR-RAM), a static random access memory (SRAM), an extended data output random access memory (EDORAM), and a Rambus random access memory (Rambus RAM); non-transitory memory such as a flash memory and a magnetic medium (for example, a hard disk or an optical memory); a register and other similar types of memory element, and the like. The storage medium may also include other types of memory or a combination thereof. In addition, the storage medium may be located in a first computer system in which a program is executed, or may be located in a second computer system coupled to the first computer system via a network, such as the Internet. The second computer system can provide program instructions to the first computer for execution. The term "storage medium" can include two or more storage media that can reside in different locations (e.g. different computer systems connected through a network). The storage medium may store program instructions (e.g. computer programs) executable by one or more processors.

In the implementations of the disclosure, the computer executable instructions contained in the storage medium are not limited to executing the operations of establishing an application predictive model as described above, and can also execute relevant operations in the method for establishing an application predictive model according to the implementations of the disclosure.

According to an implementation of the disclosure, another computer storage medium is provided. The computer storage medium can be configured to store computer executable instructions. The computer executable instructions are operable with a processor to execute the method for preloading an application. The method includes the following.

Usage status information of applications of a terminal at time point t and usage status information of the applications at time point t−1 to time point t−n are acquired, where n is a natural number greater than or equal to 2. The usage status information is input into a pre-trained application predictive model and probability values of launching each application output from the pre-trained application predictive model are acquired, where the application predictive model is generated by training a preset SRU neural network model according to multiple groups of usage timing association records, and the multiple groups of usage timing association records are obtained by grouping usage timing association records of the applications within a preset time period. An application to-be-launched at time point t+1 is determined according to the probability values and the application to-be-launched is preloaded.

The specific details of the computer storage medium in the implementations of the disclosure are similar to the computer storage medium described above, which are not described herein.

Figure 8:
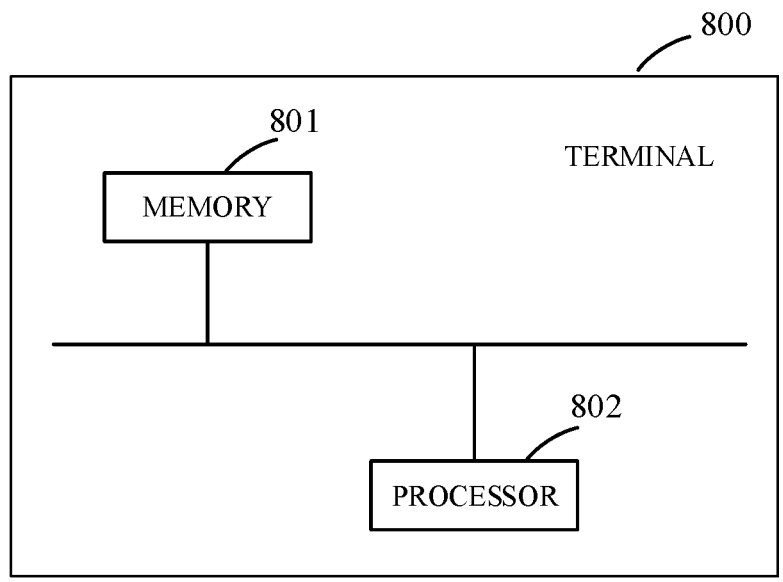
FIG. 8 is a schematic structural diagram illustrating a terminal according to an implementation of the disclosure.

According to an implementation of the disclosure, a terminal is provided. An apparatus for establishing an application predictive model described in the implementations of the disclosure can be integrated into the terminal. FIG. 8 is a schematic structural diagram illustrating a terminal according to an implementation of the disclosure. As illustrated in FIG. 8, a terminal 800 includes a memory 801, a processor 802, and computer programs stored in the memory 801. The processor 802 can be configured to execute the method for establishing an application predictive model when executing the computer programs.

The terminal described in the implementation of the disclosure can fully use the usage timing association records of the applications, which accurately reflect behaviors of the user, to optimize application preloading mechanisms, and improve the accuracy of the prediction for an application-to-be-launched.

Figure 9:
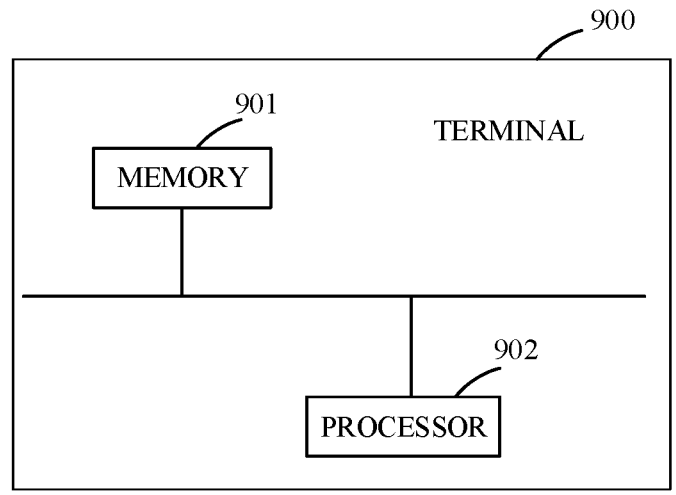
FIG. 9 is a schematic structural diagram illustrating a terminal according to another implementation of the disclosure.

According to an implementation of the disclosure, another terminal is provided. An apparatus for preloading an application described in the implementations of the disclosure can be integrated into the terminal. The terminal device includes at least one processor and a computer readable storage coupled to the at least one processor and stores at least one computer executable instruction thereon. FIG. 9 is a schematic structural diagram illustrating a terminal according to another implementation of the disclosure, in the form of a terminal includes a memory and a processor. As illustrated in FIG. 9, a terminal 900 may include a memory 901, a processor 902, and computer programs stored in the memory 901. The processor 902 can be configured to execute the method for establishing an application predictive model when executing the computer programs.

Specifically, the processor 902 is configured to acquire usage status information of applications of a terminal of at least two past time points, to acquire, from an application predictive model, probability values of launching the applications, by inputting the usage status information into the application predictive model, the application predictive model is obtained based on a simple recurrent unit (SRU) neural network model and multiple groups of usage timing association records, and to determine an application to-be-launched at a next time point according to the probability values and to preload the application to-be-launched.

The processor 902 is further configured to train the SRU neural network model according to the multiple groups of usage timing association records to obtain the application predictive model.

In terms of training the SRU neural network model according to the multiple groups of usage timing association records to obtain the application predictive model, the processor 902 is configured to acquire usage timing association records of at least two applications within a preset time period by sampling a usage log of the at least two applications according to a preset sampling period and associating the usage status information of the at least two applications according to the sampling time points, to obtain the multiple groups of usage timing association records by grouping the usage timing association records, and to train the SRU neural network model according to the multiple groups of usage timing association records to obtain the application predictive model.

In terms of obtaining the multiple groups of usage timing association records by grouping the usage timing association records, the processor 902 is configured to move forward a sliding window over the usage timing association records of the at least two applications within the preset time period, and to determine usage timing association records corresponding to the sliding window at each position as one group of usage timing association records.

The probability values include first probability values each indicating a probability of launching one of the applications and a second probability value indicating a probability of launching no application.

The terminal described in the implementation of the disclosure can acquire usage status information of applications of a terminal at time point t and usage status information of the applications at time point t−1 to time point t−n, where n is a natural number greater than or equal to 2, can input the usage status information into a pre-trained application predictive model, and can acquire probability values of launching applications output from the pre-trained application predictive model, where the application predictive model is generated by training a preset SRU neural network model according to multiple groups of usage timing association records, and the multiple groups of usage timing association records are obtained by grouping usage timing association records of the applications within a preset time period, and can determine an application to-be-launched at time point t+1 according to the probability values and can preload the application to-be-launched. In this way, it is possible to solve problems raised if too many application resources are preloaded, such as too many resources are took up, power consumption becomes large, and impact on the use of the terminal. In addition, the disclosure has advantages of effectively improving the accuracy of predicting an application to-be-launched, further reducing power consumption and memory occupation rate of a system of the terminal, and optimizing application preloading mechanisms.

According to implementations of the disclosure, a non-transitory computer readable storage medium is provided. The non-transitory computer readable storage medium stores a computer program which, when executed by a processor, causes the processor to: acquire a user behavior sample within a preset time period, the user behavior sample includes usage timing association records of at least two applications, to obtain multiple groups of usage timing association records by grouping the usage timing association records, and to train a SRU neural network model according to the multiple groups of usage timing association records to obtain an application predictive model.

The processor is further configured to: acquire usage status information of applications of a terminal of at least two past time points, to acquire, from the application predictive model, probability values of launching the applications, by processing the usage status information of the applications with the application predictive model, and to determine an application to-be-launched at a next time point according to the probability values and to preload the application to-be-launched.

Figure 10:
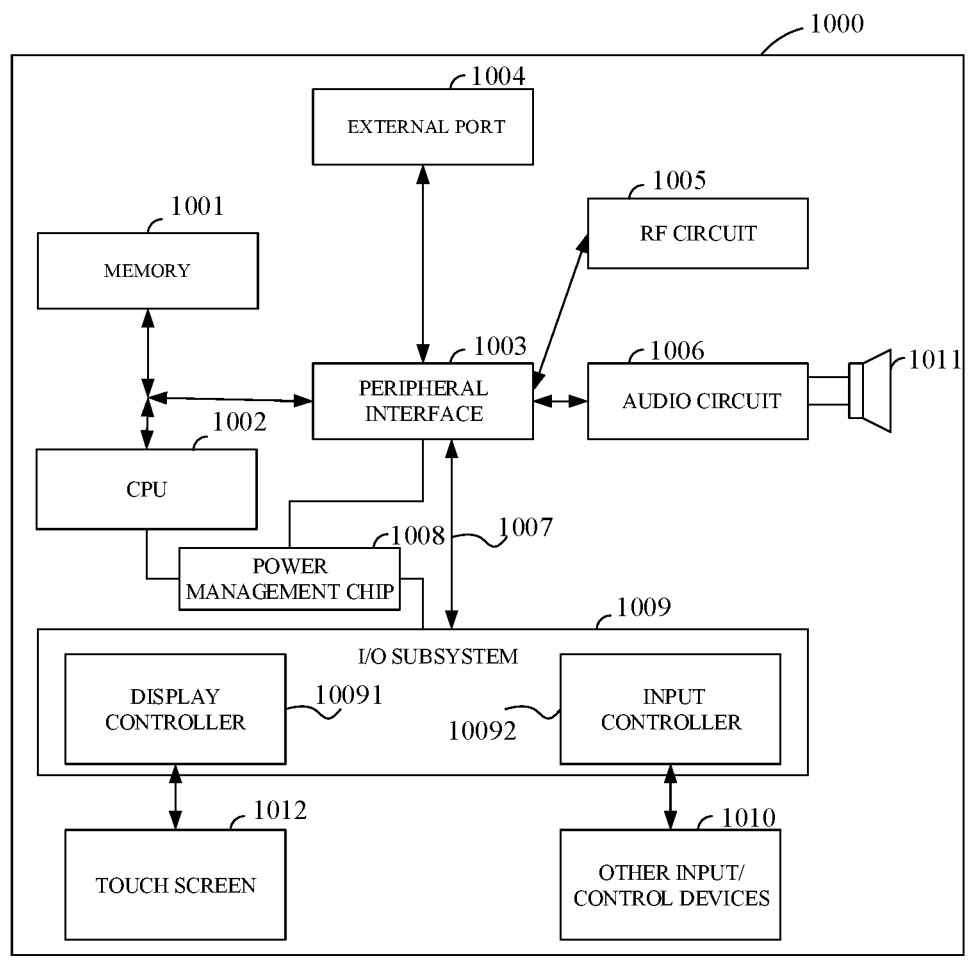
FIG. 10 is a schematic structural diagram illustrating a terminal according to yet another implementation of the disclosure.

FIG. 10 is a schematic structural diagram illustrating another terminal according to an implementation of the present disclosure. As illustrated in FIG. 10, the terminal includes a housing (not illustrated), a memory 1001, and a central processing unit (CPU) 1002 (also referred as a processor, hereinafter referred as a CPU), a circuit board (not illustrated), and a power supply circuit (not illustrated). The circuit board is disposed inside a space defined by the housing. The CPU 1002 and the memory 1001 are disposed on the circuit board. The power supply circuit is configured to supply power to each circuit or component of the terminal. The memory 1001 is configured to store executable program codes. The CPU 1002 is configured to run a computer program corresponding to the executable program codes by reading out the executable program codes stored in the memory 1001 to carry out the following operations.

Usage status information of applications of a terminal at time point t and usage status information of the applications at time point t−1 to time point t−n are acquired, where n is a natural number greater than or equal to 2. The usage status information is input into a pre-trained application predictive model and probability values of launching applications are acquired from the pre-trained application predictive model, where the application predictive model is generated by training a preset SRU neural network model according to multiple groups of usage timing association records obtained by grouping usage timing association records of the applications within a preset time period. An application to-be-launched at time point t+1 is determined according to the probability values and then preloaded.

The terminal further includes a peripheral interface 1003, an radio frequency (RF) circuit 1005, an audio circuit 1006, a speaker 1011, a power management chip 1008, an input/output (I/O) subsystem 1009, other input/control devices 1010, a touch screen 1012, other input/control devices 1010, and an external port 1004, which are communicated via one or more communication buses or signal lines 1007.

It should be understood that a terminal 1000 illustrated is exemplary and the terminal 1000 may have more or fewer components than those illustrated in the figures. For example, two or more components may be combined, or different component configurations can be adopted in the terminal. The various components illustrated in the figures can be implemented in hardware, software, or a combination of hardware and software including one or more signal processing and/or application specific integrated circuits.

The following describes a terminal as an example of an apparatus for preloading an application.

The memory 1001 can be accessed by the CPU 1002, the peripheral interface 1003 and so on. The memory 1001 may include a high-speed random access memory and may further include a non-transitory memory such as one or more magnetic disk storage devices, flash memory devices, or other volatile solid-state memory devices.

The peripheral interface 1003 is configured to connect the input and output peripherals of the apparatus to the CPU 1002 and the memory 1001.

The I/O subsystem 1009 can be configured to connect the input and the output peripherals, such as the touch screen 1012 and other input/control devices 1010, to the peripheral interface 1003. The I/O subsystem 1009 may include a display controller 10091 and one or more input controllers 10092 configured to control other input/control devices 1010. One or more input controllers 10092 are configured to receive electrical signals from or send electrical signals to other input/control devices 1010, where other input/control devices 1010 may include a physical button (a press button, a rocker button, etc.), a dial, a slide switch, a joystick, or a click wheel. It should be noted that the input controller 10092 can be coupled with any of a keyboard, an infrared port, a USB interface, and a pointing apparatus such as a mouse.

The touch screen 1012 is an input interface and an output interface between a terminal and a user, and is configured to display a visual output to the user. The visual output may include graphics, text, icons, videos, and the like.

The display controller 10091 in the I/O subsystem 1009 is configured to receive an electrical signal from or send an electrical signal to the touch screen 1012. The touch screen 1012 is configured to detect contact on the touch screen, and the display controller 10091 is configured to convert the contact detected into an interaction with a user interface object displayed on the touch screen 1012, that is, to realize human-computer interaction. The user interface object displayed on the touch screen 1012 may be an icon of a running game, an icon indicating connection to corresponding networks, and the like. It should be noted that the device may also include a light mouse, which is a touch sensitive surface that does not display a visual output, or can be an extension of a touch sensitive surface formed by the touch screen.

The RF circuit 1005 is configured to establish communication between a mobile phone and the wireless network (i.e. network side) and to transmit and receive data between the mobile phone and the wireless network, for example, transmit and receive short messages, emails, and the like. The RF circuit 1005 is configured to receive and transmit RF signals (which is also known as electromagnetic signals), to convert an electrical signal into an electromagnetic signal or convert the electromagnetic signal into the electrical signal, and to communicate with a communication network and other devices through the electromagnetic signal. The RF circuit may include known circuits for performing these functions, including but not limited to an antenna system, an RF transceiver, one or more amplifiers, a tuner, one or more oscillators, a digital signal processor, a coder-decoder (codec) chipset, a subscriber identity module (SIM) and so on.

The audio circuit 1006 is configured to receive audio data from the peripheral interface 1003, to convert the audio data into an electric signal, and to transmit the electric signal to the speaker 1011.

The speaker 1011 is configured to restore the voice signal received by the mobile phone from the wireless network via the RF circuit 1005 to sound and to play the sound to the user.

The power management chip 1008 is configured for power supply and power management of the hardware connected to the CPU 1002, the I/O subsystem 1009, and the peripheral interfaces 1003.

The apparatus for establishing an application predictive model, the storage medium, and the terminal provided in the above implementations have corresponding functional modules and can execute the corresponding method for establishing an application predictive model, and thus each contributes to advantageous effects of executing the method. For technical details not described herein, reference may be made to the description of the method for establishing an application predictive model.

The apparatus for preloading an application, the storage medium, and the terminal provided in the above implementations have corresponding functional modules and can execute the corresponding method for preloading an application, and thus each contributes to advantageous effects of executing the method. For technical details not described herein, reference may be made to the description of the method for preloading an application.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for preloading an application, comprising:
    obtaining an application predictive model by training a simple recurrent unit (SRU) neural network model according to a plurality of groups of usage timing association records of at least two applications of a terminal within a preset time period, wherein the usage timing association records exclude a usage record in which a usage duration is shorter than a predetermined period;
    acquiring usage status information of the at least two applications of the terminal at a plurality of time points prior to a next time point;
    inputting the usage status information into the application predictive model to obtain probability values of launching the at least two applications;
    determining an application to-be-launched at the next time point according to the probability values and preloading the application to-be-launched;
    determining the number of cells of an input layer of the application predictive model according to vector dimensions of each of the plurality of groups of usage timing association records; and
    determining the number of cells of an output layer of the application predictive model according to the number of the at least two applications;
    wherein the application predictive model adopts an error function, which is a cross entropy loss function expressed as:

$$J = \sum_{k=1}^{c} y_k \log(\hat{y}_k);$$

wherein $y_k$ indicates an actual value of usage status information of each application, $\hat{y}_k$ indicates a predicted value of the usage status information of each application, C=M+1, M indicates the number of the at least two applications, and J indicates a cross entropy of the application predictive model; and
    wherein obtaining the application predictive model by training the SRU neural network model according to the plurality of groups of usage timing association records comprises:
        acquiring usage timing association records of the at least two applications within the preset time period;
        obtaining the plurality of groups of usage timing association records by grouping the usage timing association records; and
        training the SRU neural network model according to the plurality of groups of usage timing association records to obtain the application predictive model.

2. The method of claim 1, wherein the acquiring usage timing association records of the at least two applications within the preset time period comprises:
    sorting applications according to frequencies of use of the applications within the preset time period;
    determining the at least two applications according to a sorting result; and determining the usage timing association records according to usage status information of the at least two applications.

3. The method of claim 2, wherein
the determining the usage timing association records according to usage status information of the at least two applications comprises:
sampling a usage log of the at least two applications according to a preset sampling period and determining whether the at least two applications are in use at sampling time points in the preset sampling period; and
determining the usage timing association records by associating the usage status information of the at least two applications according to the sampling time points; and
the training the SRU neural network model according to the plurality of groups of usage timing association records comprises:
training the SRU neural network model according to the usage status information of the at least two applications at the sampling time points in the plurality of groups of usage timing association records.

4. The method of claim 3, wherein the plurality of groups of usage timing association records are (m−n+1) groups of usage timing association records, n indicates the number of sampling time points associated with each of the plurality of groups of usage timing association records and is an integer greater than or equal to 2, and m indicates the total number of sampling time points in the preset sampling period and is an integer greater than or equal to 3; and
the $i^{th}$ group of usage timing association records comprises usage timing association records of the at least two applications at the $i^{th}$ to the $(i+n-1)^{th}$ sampling time point, and i is an integer and ranges from 1 to (m−n+1).

5. The method of claim 1, wherein obtaining the plurality of groups of usage timing association records by grouping the usage timing association records comprises:
applying a sliding window to the usage timing association records of the at least two applications within the preset time period; and
determining usage timing association records corresponding to the sliding window at each position as one group of usage timing association records.

6. The method of claim 1, the application predictive model comprising a forget gate $f_t$, a reset gate $r_t$, a memory cell $c_t$, and an output status cell $h_t$, which are expressed as follows:

$$\tilde{x}_t = Wx_t$$
$$f_t = \sigma(W_f x_t + b_f)$$
$$r_t = \sigma(W_r x_t + b_r)$$
$$c_t = f_t \otimes c_{t-1} + (1 - f_t) \otimes \tilde{x}_t$$
$$h_t = r_t \otimes g(c_t) + (1 - r_t) \otimes x_t$$

$x_t$ indicating usage status information of an application used at time point t in the usage timing association records and $\tilde{x}_t$ indicating an input conversion amount of the usage status information of the application used at time point t in the usage timing association records; W and $W_\square$ indicating network parameters learned, $b_\square$ indicating a bias parameter learned, and $* \in \{f, r\}$; $f_t$ indicating a forget gate at time point t and $r_t$ indicating a reset gate at time point t; $c_t$ indicating an internal status cell at time point t, $c_{t-1}$ indicating an internal status cell at time point t−1, and $h_t$ indicating an output status cell at time point t; a indicating a Sigmoid function; ⊗ indicating element-wise product of vectors; and go indicating an activation function.

7. The method of claim 1, wherein the probability values comprise first probability values each indicating a probability of launching one of the at least two applications and a second probability value indicating a probability of launching no application.

8. A terminal device, comprising:
at least one processor; and
a computer readable storage, coupled to the at least one processor and storing at least one computer executable instruction thereon which, when executed by the at least one processor, causes the at least one processor to:
acquire usage status information of at least two applications of the terminal device at a plurality of time points prior to a next time point;
acquire, from an application predictive model, probability values of launching the at least two applications, by inputting the usage status information into the application predictive model, the application predictive model being obtained based on a simple recurrent unit (SRU) neural network model and a plurality of groups of usage timing association records of the at least two applications of the terminal device within a preset time period, wherein the usage timing association records exclude a usage record in which a usage duration is shorter than a predetermined period;
determine an application to-be-launched at the next time point according to the probability values and preload the application to-be-launched;
determine the number of cells of an input layer of the application predictive model according to vector dimensions of each of the plurality of groups of usage timing association records; and
determine the number of cells of an output layer of the application predictive model according to the number of the at least two applications;
wherein the application predictive model adopts an error function, which is a cross entropy loss function expressed as:

$$J = \sum_{k=1}^{C} y_k \log(\hat{y}_k),$$

wherein $y_k$ indicates an actual value of usage status information of each application, $\hat{y}_k$ indicates a predicted value of the usage status information of each application, C=M+1, M indicates the number of the at least two applications, and J indicates a cross entropy of the application predictive model.

9. The terminal device of claim 8, wherein the at least one processor is further configured to:
train the SRU neural network model according to the plurality of groups of usage timing association records to obtain the application predictive model.

10. The terminal device of claim 9, wherein the at least one processor configured to train the SRU neural network model according to the plurality of groups of usage timing association records to obtain the application predictive model is configured to:

acquire usage timing association records of the at least two applications within a preset time period by sampling a usage log of the at least two applications according to a preset sampling period and associate usage status information of the at least two applications according to the sampling time points;

obtain the plurality of groups of usage timing association records by grouping the usage timing association records; and train the SRU neural network model according to the plurality of groups of usage timing association records to obtain the application predictive model.

11. The terminal device of claim 10, wherein the plurality of groups of usage timing association records are (m−n+1) groups of usage timing association records, n indicates the number of sampling time points associated with each of the plurality of groups of usage timing association records and is an integer greater than or equal to 2, and m indicates the total number of sampling time points in the preset sampling period and is an integer greater than or equal to 3, wherein the $i^{th}$ group of usage timing association records comprises usage timing association records of the at least two applications at the $i^{th}$ to the $(i+n-1)^{th}$ sampling time point, and i is an integer and ranges from 1 to (m−n+1).

12. The terminal device of claim 10, wherein the at least one processor configured to carry out the obtaining the plurality of groups of usage timing association records by grouping the usage timing association records is configured to:

move forward a sliding window over the usage timing association records of the at least two applications within the preset time period; and determine usage timing association records corresponding to the sliding window at each position as one group of usage timing association records.

13. The terminal device of claim 8, the application predictive model comprising a forget gate $f_t$, a reset gate $r_t$, a memory cell $c_t$, and an output status cell $h_t$, which are expressed as follows:

$$\tilde{x}_t = W x_t$$
$$f_t = \sigma(W_f x_t + b_f)$$
$$r_t = \sigma(W_r x_t + b_r)$$
$$c_t = f_t \otimes c_{t-1} + (1 - f_t) \otimes \tilde{x}_t$$
$$h_t = r_t \otimes g(c_t) + (1 - r_t) \otimes x_t$$

$x_t$ indicating usage status information of an application used at time point t in the usage timing association records and $\tilde{x}_t$ indicating an input conversion amount of the usage status information of the application used at time point t in the usage timing association records; W and $W_\square$ indicating network parameters learned, $b_\square$ indicating a bias parameter learned, and $* \in \{f, r\}$; $f_t$ indicating a forget gate at time point t and $r_t$ indicating a reset gate at time point t; $c_t$ indicating an internal status cell at time point t, $c_{t-1}$ indicating an internal status cell at time point t−1, and $h_t$ indicating an output status cell at time point t; σ indicating a Sigmoid function; ⊗ indicating element-wise product of vectors; and go indicating an activation function.

14. The terminal device of claim 8, wherein the probability values comprise first probability values each indicating a probability of launching one of the at least two applications and a second probability value indicating a probability of launching no application.

15. A non-transitory computer readable storage medium storing a computer program which, when executed by a processor, causes the processor to:

acquire a user behavior sample within a preset time period, the user behavior sample comprising usage timing association records of at least two applications of a terminal;

obtain a plurality of groups of usage timing association records by grouping the usage timing association records; and train a simple recurrent unit (SRU) neural network model according to the plurality of groups of usage timing association records to obtain an application predictive model of the at least two applications of the terminal within a preset time period, wherein the usage timing association records exclude a usage record in which a usage duration is shorter than a predetermined period;

wherein the application predictive model comprises a forget gate $f_t$, a reset gate $r_t$, a memory cell $c_t$, and an output status cell $h_t$, which are expressed as follows:

$$\tilde{x}_t = W x_t$$
$$f_t = \sigma(W_f x_t + b_f)$$
$$r_t = \sigma(W_r x_t + b_r)$$
$$c_t = f_t \otimes c_{t-1} + (1 - f_t) \otimes \tilde{x}_t$$
$$h_t = r_t \otimes g(c_t) + (1 - r_t) \otimes x_t$$

$x_t$ indicating usage status information of an application used at time point t in the usage timing association records and $\tilde{x}_t$ indicating an input conversion amount of the usage status information of the application used at time point t in the usage timing association records; W and $W_\square$ indicating network parameters learned, $b_\square$ indicating a bias parameter learned, and $* \in \{f, r\}$; $f_t$ indicating a forget gate at time point t and $r_t$ indicating a reset gate at time point t; $c_t$ indicating an internal status cell at time point t, $c_{t-1}$ indicating an internal status cell at time point t−1, and $h_t$ indicating an output status cell at time point t; σ indicating a Sigmoid function; ⊗ indicating element-wise product of vectors; and go indicating an activation function.

16. The non-transitory computer readable storage medium of claim 15, wherein the processor is further configured to:

acquire usage status information of the at least two applications at a plurality of time points prior to a next time point;

acquire, from the application predictive model, probability values of launching the at least two applications, by processing the usage status information of the at least two applications with the application predictive model; and determine an application to-be-launched at the next time point according to the probability values and preloading the application to-be-launched.

* * * * *